(12) United States Patent
Lin (10) Patent No.: US 7,761,671 B2
(45) Date of Patent: Jul. 20, 2010

(54) DATA DISPLACEMENT BYPASS SYSTEM

(75) Inventor: Ju-Pai Lin, Taipei (TW)

(73) Assignee: Zi San Electronics Corp., Taipei (TW)

( * ) Notice: Subject to any disclaimer, the term of this patent is extended or adjusted under 35 U.S.C. 154(b) by 573 days.

(21) Appl. No.: 11/838,852

(22) Filed: Aug. 14, 2007

(65) Prior Publication Data

US 2009/0049244 A1 Feb. 19, 2009

(51) Int. Cl.
*G06F 12/00* (2006.01)
*G06F 13/00* (2006.01)
*G06F 13/28* (2006.01)
*G06F 11/00* (2006.01)

(52) U.S. Cl. ............... 711/154; 711/102; 711/103; 714/30; 714/E11.145; 714/E11.148; 714/E11.169

(58) Field of Classification Search ............ 714/30, 714/E11.145, E11.148, E11.169
See application file for complete search history.

(56) References Cited

U.S. PATENT DOCUMENTS

| | | | |
|---|---|---|---|
| 5,327,531 A * | 7/1994 | Bealkowski et al. ......... 714/6 |
| 5,471,674 A * | 11/1995 | Stewart et al. ............. 713/2 |
| 5,875,293 A * | 2/1999 | Bell et al. ................ 714/27 |
| 5,987,625 A * | 11/1999 | Wolff ..................... 714/36 |
| 6,182,187 B1 * | 1/2001 | Cox et al. ................. 711/5 |
| 7,062,598 B1 * | 6/2006 | Lapidus et al. ............ 711/102 |
| 2003/0088763 A1* | 5/2003 | Nakaya .................... 713/1 |

* cited by examiner

Primary Examiner—Sheng-Jen Tsai
Assistant Examiner—Michael Alsip
(74) Attorney, Agent, or Firm—WPAT., P.C.; Justin King (57) ABSTRACT

A data displacement bypass system is disclosed, wherein the data displacement bypass system comprises a CPU (Central Processing Unit), a first memory, a plurality of address lines, a plurality of data lines, an OE (Output Enable) line, a CS (Chip Select) line and a data displacement unit. The CPU could output a plurality of address characters, an OE signal and a CS signal, and receive a plurality of data characters. The first memory and the data displacement unit could output the plurality of data characters according to the plurality of address characters, the OE signal and the CS signal received by the first memory and the data displacement unit, wherein the data displacement unit could govern the plurality of data characters inputting to the CPU by outputting high or low voltage.

10 Claims, 6 Drawing Sheets

DATA DISPLACEMENT BYPASS SYSTEM

BACKGROUND OF THE INVENTION

1. Field of the Invention

The present invention generally relates to data displacement system, and more particularly to data displacement bypass system.

2. Description of the Prior Art

In a computer system, many routine control procedure and data related to thereof are always stored up in a EPROM (Erasable Programmable Read Only Memory). For example, BIOS is always stored up in a ROM (Read Only Memory), and the CPU of the computer system could search data according to addresses on the memory.

Figure 1:
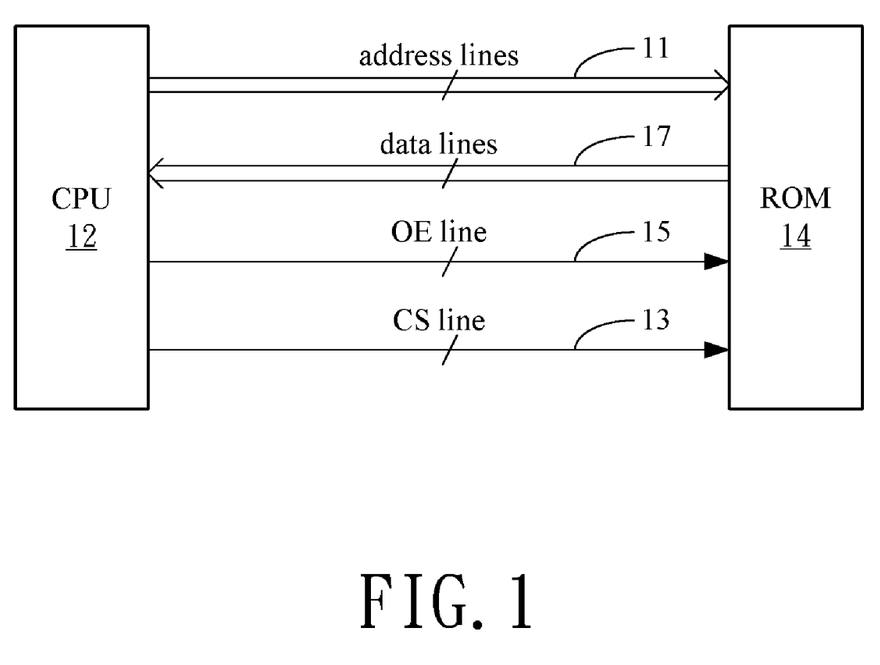
FIG. 1 is a diagram illustrates the structure of a traditional computer system.

Please refer to FIG. 1, the computer could comprise a CPU 12 and a ROM 14, wherein the CPU 12 and the ROM 14 are electrically coupled with a plurality of address lines 11, a CS line 13, an OE line 15 and a plurality of data lines 17 respectively. The ROM 14 could receive a plurality of address characters, CS signals and OE signals outputted from the CPU 12 via the plurality of address lines 11, the CS line 13, the OE line 15 respectively, and the output a plurality of data characters via the plurality of data lines 17 according to the plurality of address characters, CS signals and OE signals.

Figure 2:
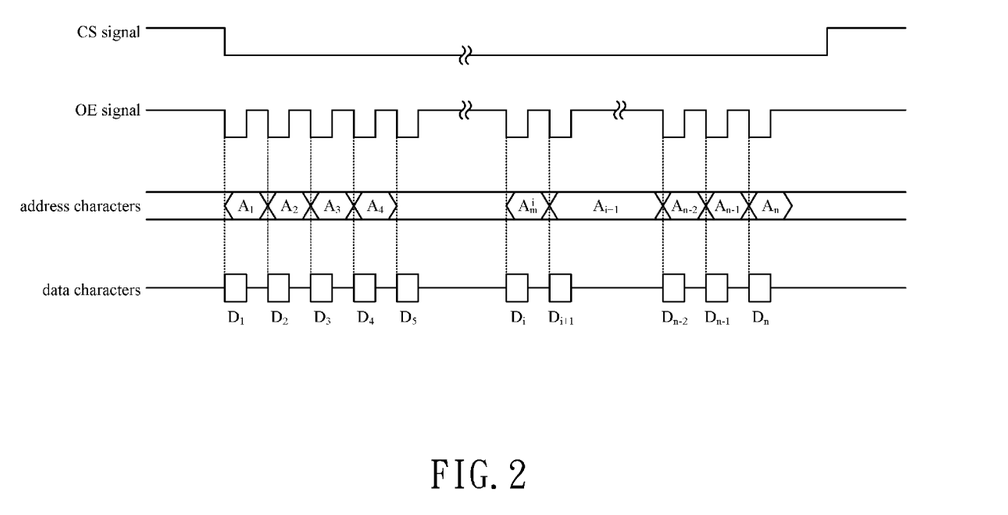
FIG. 2 is a diagram depicts the time sequence of a traditional computer system.

FIG. 2 is a time sequence diagram that the CPU 12 searches in the ROM 14. The ROM 14 outputs the plurality of data characters ($D_1$, $D_2$ . . . and $D_n$) according to the plurality of address characters ($A_1$, $A_2$ . . . and $A_n$) when the CS signal is a low voltage (or a logic value is 0). The plurality of data characters ($D_1$, $D_2$ . . . and $D_n$) are outputted when the OE signal is the low voltage (or the logic value is 0).

The ROM 14 of the computer system must be fixed, and the data of the ROM must be updated after the ROM 14 is disassembled. Therefore, the ROM 14 must be disassembled and the test ROM must be installed when the computer system needs to be tested. So a system for testing the computer system without disassembling the ROM 14 is necessary.

SUMMARY OF THE INVENTION

Therefore, in accordance with the previous summary, objects, features and advantages of the present disclosure will become apparent to one skilled in the art from the subsequent description and the appended claims taken in conjunction with the accompanying drawings.

A data displacement bypass system is disclosed, wherein the data displacement bypass system comprises a CPU (Central Processing Unit), a first memory, a plurality of address lines, a plurality of data lines, an OE (Output Enable) line, a CS (Chip Select) line and a data displacement unit. The CPU could output a plurality of address characters, an OE signal and a CS signal, and receive a plurality of data characters. The first memory and the data displacement unit could output the plurality of data characters according to the plurality of address characters, the OE signal and the CS signal received by the first memory and the data displacement unit, wherein the data displacement unit could govern the plurality of data characters inputting to the CPU by outputting high or low voltage.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

The present disclosure can be described by the embodiments given below. It is understood, however, that the embodiments below are not necessarily limitations to the present disclosure, but are used to a typical implementation of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary the intent is to cover all alternatives, modifications and equivalents included within the spirit and scope of the invention as defined by the appended claims.

It is noted that the drawings presents herein have been provided to illustrate certain features and aspects of embodiments of the invention. It will be appreciated from the description provided herein that a variety of alternative embodiments and implementations may be realized, consistent with the scope and spirit of the present invention.

It is also noted that the drawings presents herein are not consistent with the same scale. Some scales of some components are not proportional to the scales of other components in order to provide comprehensive descriptions and emphasizes to this present invention.

Figure 3:
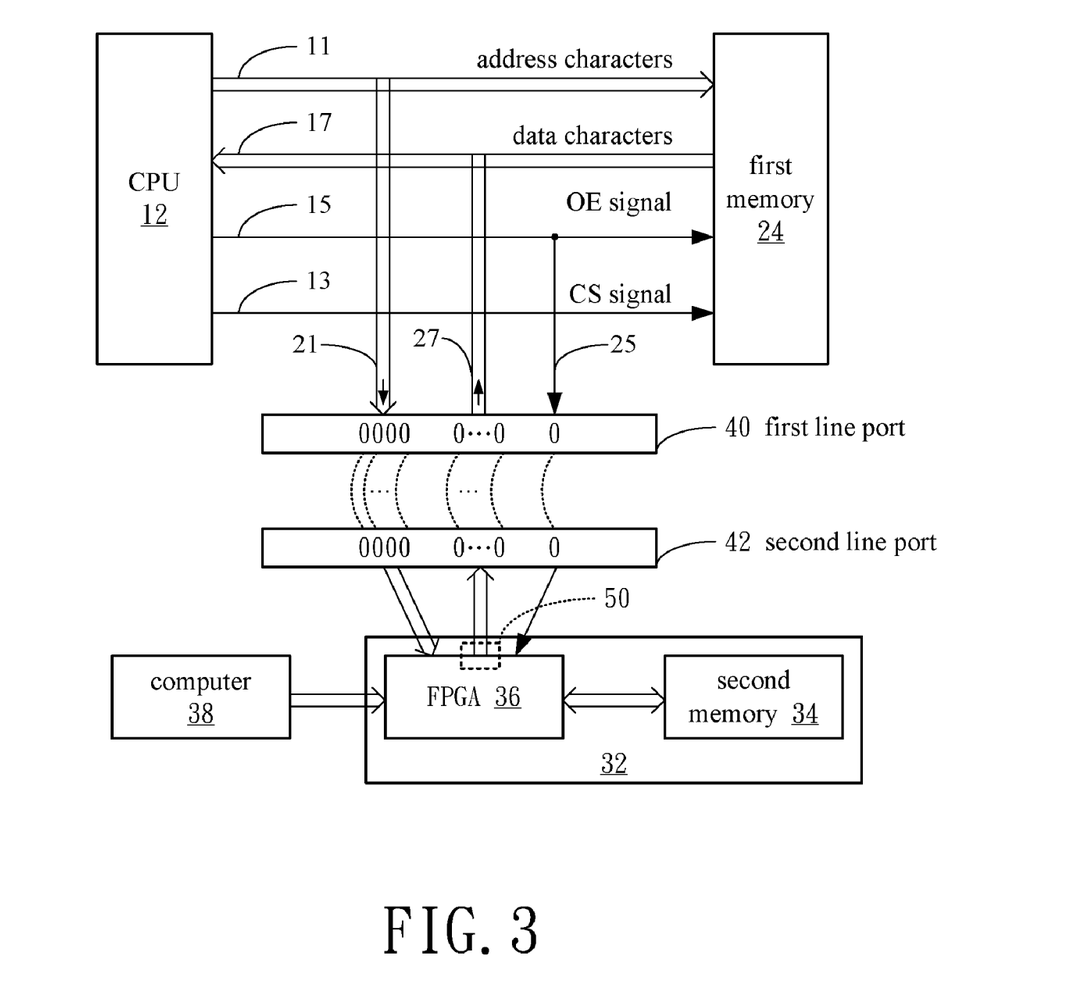
FIG. 3 and FIG. 5 are diagrams show the structure of a data displacement bypass system.

Please refer to FIG. 3, which is a structure diagram of a data displacement bypass system. The data displacement bypass system comprises a plurality of address lines 11, a CPU (Central Processing Unit) 12, a CS (Chip Select) line 13, an OE (Output Enable) line 15, a plurality of data lines 17, a first memory 24 and a data displacement unit 32.

The CPU 12 could output a plurality of address characters, an OE signal and a CS signal and receive a plurality of data characters, wherein the binary value of the CS signal from the CPU 12 is one of a first high voltage and a first low voltage.

In addition, the first memory 24 could receive the plurality of data characters, said OE signal and said CS signal and then output the plurality of data characters according to the plurality of data characters, the OE signal and the CS signal, wherein the binary value of every data character from the first memory 24 is one of a second high voltage and a second low voltage. When the CS signal received by the first memory 24 is equal to or smaller than the first low voltage, the first memory 24 outputs the plurality of data characters. On the contrary, the first memory 24 stops outputting the plurality of data characters when the CS signal received by the first memory 24 is equal to or bigger than the first high voltage.

It would have been obvious to one having ordinary skill in the art that the binary value of every address character, every data character, the OE signal or the CS signal could be a high voltage or a low voltage, wherein the high voltage and the low voltage are comparative. For example, the high voltage and the low voltage could be respectively represented as "1" and "0" of the binary value. Moreover, the high voltages or the low voltages of different signals could be different, for example, the high voltage of the OE signal could be different from the high voltage of the CS signal.

The plurality of address characters are transmitted via the plurality of address lines 11, and the OE signal is transmitted via the OE line 15, wherein the plurality of data characters are outputted according to the OE signal. The CS signal is transmitted via the CS line 13, and the plurality of data characters from the first memory 24 are outputted according to the CS signal, and the plurality of data characters are transmitted via the plurality of data lines 17.

The data displacement unit 32 could receive the plurality of address characters via a plurality of address lines 21 and an OE signal via the OE line 25, and output the CS signal and the plurality of data characters according to the plurality of address characters and the OE signal by a signal amplifier 50, wherein the signal amplifier 50 could be electrically coupled with a plurality of data lines 27 or a CS line 23. The binary value of the CS signal outputted from the data displacement unit 32 by the signal amplifier 50 is one of a third high voltage and a third low voltage, and the binary value of every data character outputted from the data displacement unit 32 by the signal amplifier 50 is one of a fourth high voltage and a fourth low voltage.

The plurality of address characters are transmitted to the data displacement unit 32 via the plurality of address lines 21, and the plurality of data characters from the data displacement unit 32 are transmitted to the CPU 12 via the plurality of data lines 27, wherein the plurality of address lines 21 are electrically coupled with the plurality of address lines 11, and the plurality of data lines 27 are electrically coupled with the plurality of data lines 17.

It would have been obvious to one having ordinary skill in the art that every address line 21 could be electrically coupled with every address line 11 as one-to-one. Similarly, every data line 27 could be electrically coupled with every data line 17 as one-to-one. In addition, the OE signal is transmitted to the data displacement unit 32 via the OE line 25, wherein the plurality of data characters are outputted according to the OE signal. The CS signal from the data displacement unit 32 is transmitted to the first memory 24 via the CS line 23, wherein the plurality of data characters from the first memory 24 are outputted according to the CS signal. The OE line 25 and the CS line 23 are electrically coupled with the OE line 15 and the CS line 13 respectively.

The plurality of data characters are outputted when the OE signal is a low voltage and are stopped outputting when the OE signal is a high voltage, wherein the low voltage is below or under the first low voltage, and the high voltage is over and above the first high voltage. The first high voltage and the second high voltage could be +5 volt, and the first low voltage and the second low voltage could be −5 volt. Furthermore, the third high voltage and the fourth high voltage could be +10 volt, and the third low voltage and the fourth low voltage could be −10 volt.

According to the above-mentioned, the voltage of the plurality of data lines 17 is equal to or smaller than the first low voltage when the signal amplifier 50 is electrically coupled with the plurality of data lines 27, and the plurality of data characters from the data displacement unit 32 are outputted as the fourth low voltage by the signal amplifier 50. The voltage of the plurality of data lines 17 is equal to or bigger than the first high voltage when the signal amplifier 50 is electrically coupled with the plurality of data lines 27, and the plurality of data characters from data displacement unit 32 are outputted as the fourth high voltage by the signal amplifier 50.

For example, when the fourth low voltage (−10 Volt) is outputted to the plurality of data lines 27 from the data displacement unit 32 by the signal amplifier 50, the voltage of the plurality of data lines 17 is certainly below or under the first low voltage (−5 Volt) whether the second high voltage (+5 Volt) or the second low voltage (−5 Volt) is outputted from the first memory 24 via the plurality of data lines 17. The voltage of the plurality of data lines 17 is the addition of the fourth low voltage (−10 Volt) and the second high voltage (+5 Volt) or the addition of the fourth low voltage (−10 Volt) and the second low voltage (−5 Volt). Hence, the voltage of the plurality of data characters received by the CPU 12 is certainly below or under the first low voltage (−5 Volt).

On the contrary, when the fourth high voltage (+10 Volt) is outputted to the plurality of data lines 27 from the data displacement unit 32 by the signal amplifier 50, the voltage of the plurality of data lines 17 is certainly over and above the first high voltage (−5 Volt) whether the second high voltage (+5 Volt) or the second low voltage (−5 Volt) is outputted from the first memory 24 via the plurality of data lines 17. The voltage of the plurality of data lines 17 is the addition of the fourth high voltage (+10 Volt) and the second high voltage (+5 Volt) or the addition of the fourth high voltage (+10 Volt) and the second low voltage (−5 Volt). Hence, the voltage of the plurality of data characters received by the CPU 12 is certainly over and above the first high voltage (+5 Volt).

Figure 4:
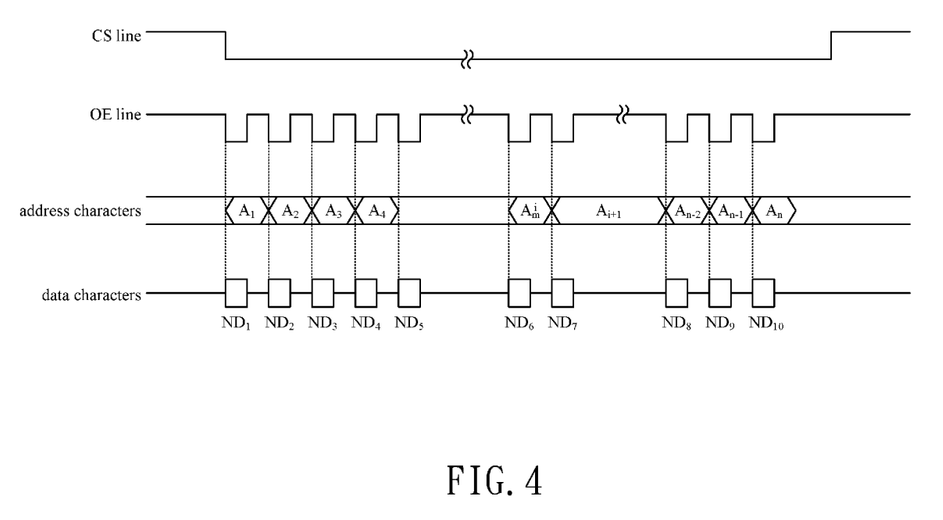
FIG. 4 and FIG. 6 are diagrams represent the time sequence of a data displacement bypass system.

FIG. 4 is a time sequence diagram that the CPU 12 receives the plurality of data characters such as $ND_1, ND_2 \ldots$ and $ND_n$. The first memory 24 and the displacement unit 32 respectively output the plurality of data characters corresponding to thereof according to the plurality of address characters such as $A_1, A_2 \ldots$ and $A_n$ when the CS signal is low voltage (or the logic value is 0). The plurality of data characters "$ND_1, ND_2 \ldots$ and $ND_n$" are the addition of the plurality of data characters from the first memory 24 and the data displacement unit 32 when the OE signal is the low voltage (or the logic value is 0).

Figure 5:
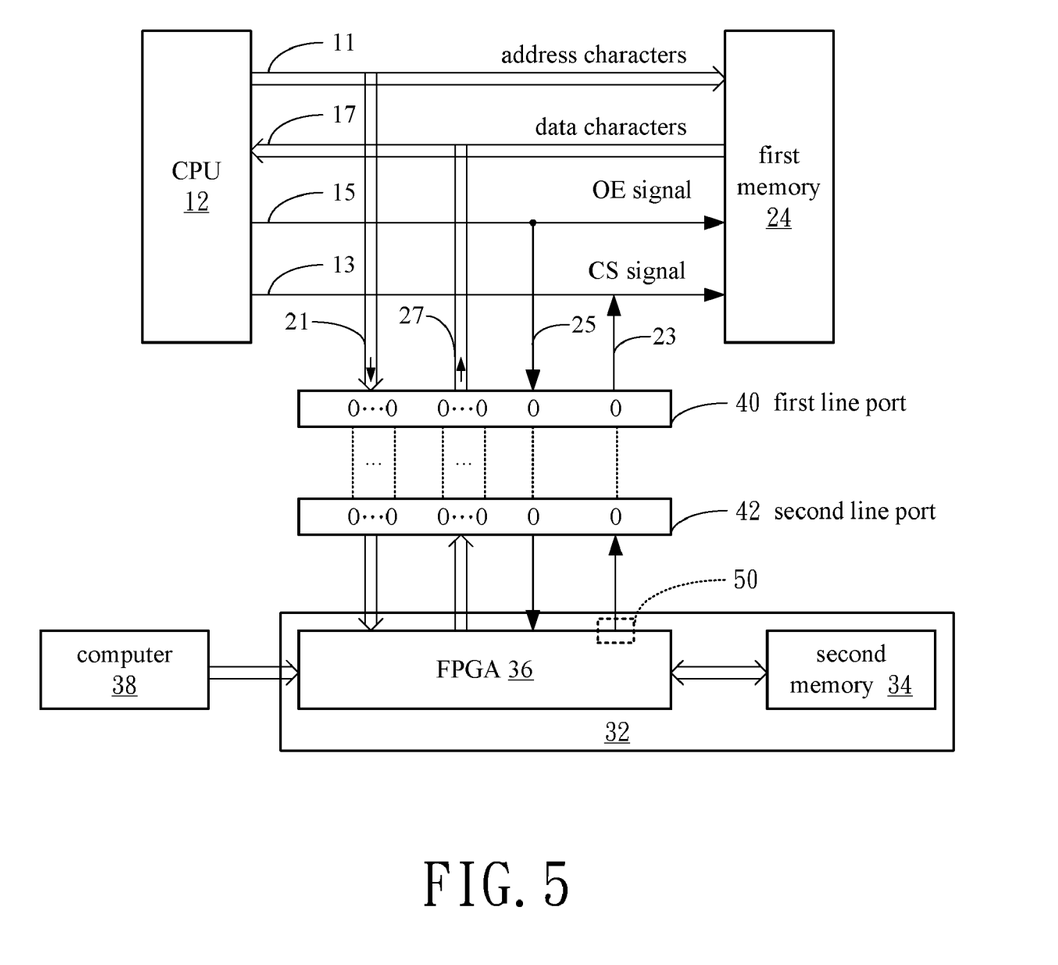

Please refer to FIG. 5, the voltage of the CS lines 13 is equal to or bigger than the first high voltage when the signal amplifier 50 is electrically coupled with the CS signal 23, and the CS signal from the data displacement unit 32 are outputted as the third high voltage by the signal amplifier 50. For example, when the third high voltage (+10 Volt) is outputted to the CS line 23 from the data displacement unit 32 by the signal amplifier 50, the voltage of the CS line 1 is certainly over and above the first high voltage (+5 Volt) whether the first high voltage (+5 Volt) or the first low voltage (−5 Volt) is outputted from the CPU 12 via the CS line 13. The voltage of the CS line 13 is the addition of the first low voltage (−5 Volt) and the third high voltage (+10 Volt) or the addition of the first high voltage (+5 Volt) and the third high voltage (+10 Volt). Hence, when the voltage of the CS signal received by the first memory 24 is over and above the first high voltage (+5 Volt), the first memory 24 would stop outputting the plurality of data characters and the CPU only receives the plurality of data characters outputted from the data displacement unit 32.

Figure 6:
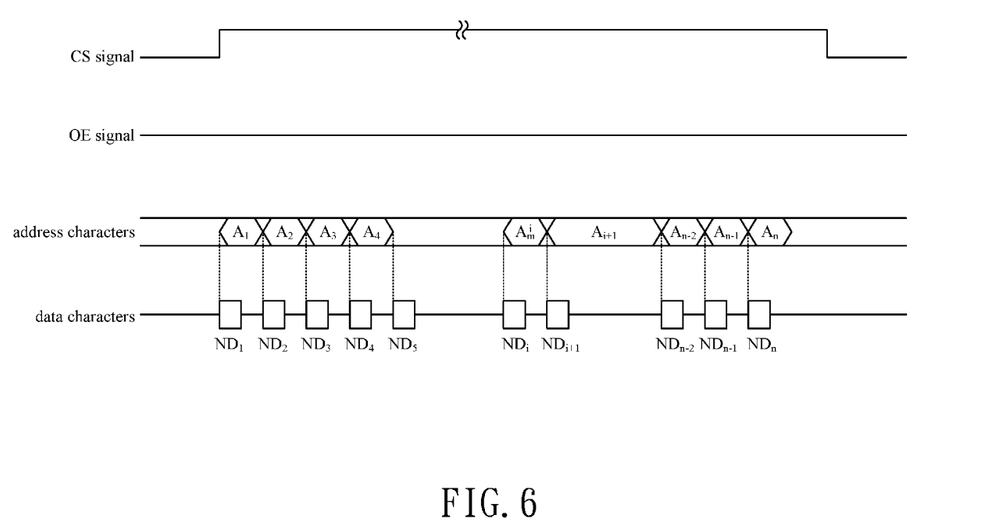

FIG. 6 is a time sequence diagram that the CPU 12 receives the plurality of data characters such as $ND_1, ND_2 \ldots$ and $ND_n$. Because the voltage of the CS line 13 is over and above the first high voltage, the first memory 24 stops outputting the plurality of data characters. The displacement unit 32 outputs the plurality of data characters "$ND_1, ND_2 \ldots$ and $ND_n$" corresponding to thereof according to the plurality of address characters such as $A_1, A_2 \ldots$ and $A_n$ when the CS signal is low voltage (or the logic value is 0).

Besides, the data displacement bypass system 10 further comprises a first line port 40 and a second line port 42, wherein the first line port 40 is electrically coupled with the plurality of data lines 17 and the OE line 15, and the second line port 42 is electrically coupled with the data displacement unit 32. The plurality of data characters from the data displacement unit 32 are outputted by the first line port 40 and the second line port 42 when the first line port 40 is electrically coupled with the second line port 42.

The data displacement unit 32 further comprises a second memory 34, wherein the second memory 34 outputs the plurality of data characters according to the plurality of address characters, and the data displacement unit 32 outputs the plurality of data characters from the second memory 34 according to the OE signal and the plurality of data characters from the second memory 34.

As shown in FIG. 3, the plurality of data characters from the second memory 34 is added to the plurality of data characters from the first memory 24 at the plurality of data lines 17. As shown in FIG. 5, because the third high voltage from the data displacement unit 32 is outputted to the CS line 13, the voltage of the CS line 13 must keep over and above the first high voltage, and then the first memory 24 stops outputting the plurality of data characters. Hence, the high voltages or the low voltages of every data character are the same when the logic values from the data displacement unit 32 and the first memory 24 are the same.

The data displacement bypass system 10 further comprises a FPGA (Field Programmable Gate Array) 36 for outputting the plurality of data characters, wherein the binary value of every data character could be outputted as the fourth high voltage or the fourth low voltage by the FPGA 36. The data displacement bypass system 10 further comprises a computer 38, wherein the plurality of data characters provided from the computer could be written in the second memory 34 by said FPGA 36.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breath to which they are fairly and legally entitled.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A data displacement bypass system, comprising:
 a CPU (Central Processing Unit), for outputting a plurality of address characters, an OE (Output Enable) signal and a CS (Chip Select) signal and receiving a plurality of data characters, wherein the binary value of said CS signal from said CPU is one of a first high voltage and a first low voltage;
 a first memory, for receiving said plurality of data characters, said OE signal and said CS signal and outputting said plurality of data characters according to said plurality of data characters, said OE signal and said CS signal, wherein the binary value of every data character from said first memory is one of a second high voltage and a second low voltage;
 a plurality of address lines, wherein said plurality of address characters are transmitted via said plurality of address lines;
 an OE line, wherein said OE signal is transmitted via said OE line, and said plurality of data characters are outputted according to said OE signal;
 a CS line, wherein said CS signal is transmitted via said CS line, and said plurality of data characters from said first memory are outputted according to said CS signal;
 a plurality of data lines, wherein said plurality of data characters are transmitted via said plurality of data lines; and
 a data displacement unit, for receiving said plurality of address characters and said OE signal and outputting said CS signal and said plurality of data characters according to said plurality of address characters and said OE signal, wherein said data displacement unit comprises a signal amplifier electrically coupled with said plurality of data lines or said CS line, wherein the binary value of said CS signal outputted from said data displacement unit by said signal amplifier is one of a third high voltage and a third low voltage, wherein the binary value of every data character outputted from said data displacement unit by said signal amplifier is one of a fourth high voltage and a fourth low voltage,
 wherein the voltage of said CS line is equal to or bigger than said first voltage when said signal amplifier is electrically coupled with said CS line, and said CS signal from data displacement unit is outputted as said third high voltage by said signal amplifier,
 the voltage of said plurality of data lines is equal to or smaller than said first low voltage when said signal amplifier is electrically coupled with said plurality of data lines, and said plurality of data characters from data displacement unit are outputted as said fourth low voltage by said signal amplifier, or
 the voltage of said plurality of data lines is equal to or bigger than said first high voltage when said signal amplifier is electrically coupled with said plurality of data lines, and said plurality of data characters from data displacement unit are outputted as said fourth high voltage by said signal amplifier.

2. A data displacement bypass system of claim 1, wherein said first memory outputs said plurality of data characters when said CS signal received by said first memory is equal to or smaller than said first low voltage, and said first memory stops outputting said plurality of data characters when said CS signal received by said first memory is equal to or bigger than said first high voltage.

3. A data displacement bypass system of claim 1, said plurality of data characters are outputted when said OE signal is outputted as a low voltage, and said plurality of data characters are stopped outputting when said OE signal is outputted as a high voltage, wherein said low voltage is below or under said first low voltage, and said high voltage is over and above said first high voltage.

4. A data displacement bypass system of claim 1, wherein said first memory is a Rom (Read Only Memory).

5. A data displacement bypass system of claim 1, further comprising a first line port and a second line port, wherein said first line port is electrically coupled with said plurality of data lines and said OE line, and said second line port is electrically coupled with said data displacement unit, wherein said plurality of data characters from said data displacement unit are outputted by said first and second line ports when said first line port is electrically coupled with said second line port.

6. A data displacement bypass system of claim 1, wherein said second high voltage is equal to or bigger than double said first high voltage.

7. A data displacement bypass system of claim 1, wherein said data displacement unit comprises a second memory for providing said plurality of data characters according to said plurality of address characters.

8. A data displacement bypass system of claim 7, wherein said data displacement unit outputs said plurality of data characters from said second memory according to said OE signal and said plurality of data characters from said second memory.

9. A data displacement bypass system of claim 8, further comprising a FPGA (Field Programmable Gate Array) for outputting said plurality of data characters.

10. A data displacement bypass system of claim 9, further comprising a computer, wherein said plurality of data characters provided from said computer are written in said second memory by said FPGA.

* * * * *